(12) United States Patent
Mudge

(10) Patent No.: US 7,576,647 B1
(45) Date of Patent: Aug. 18, 2009

(54) SELF-POWERED LONG-LIFE OCCUPANCY SENSORS AND SENSOR CIRCUITS

(75) Inventor: Philip H Mudge, Brookfield, CT (US)

(73) Assignee: ABL IP Holding, LLC, Conyers, GA (US)

( * ) Notice: Subject to any disclaimer, the term of this patent is extended or adjusted under 35 U.S.C. 154(b) by 839 days.

(21) Appl. No.: 11/045,931

(22) Filed: Jan. 28, 2005

Related U.S. Application Data

(62) Division of application No. 10/144,450, filed on May 10, 2002, now Pat. No. 6,850,159.

(60) Provisional application No. 60/291,188, filed on May 15, 2001.

(51) Int. Cl.
G08B 13/00 (2006.01)
H01H 47/00 (2006.01)
H01H 47/14 (2006.01)

(52) U.S. Cl. .................... 340/541; 361/166

(58) Field of Classification Search ......... 340/541–567; 361/166–169.1
See application file for complete search history.

(56) References Cited

U.S. PATENT DOCUMENTS

| | | | |
|---|---|---|---|
| 3,748,640 A | 7/1973 | Sardo, Jr. | |
| 3,767,002 A | 10/1973 | Gillund | |
| 3,794,969 A * | 2/1974 | Klopfenstein et al. | 340/439 |
| 3,904,920 A * | 9/1975 | Griffith | 315/78 |
| 3,936,822 A | 2/1976 | Hirschberg | |
| 4,060,123 A | 11/1977 | Hoffman et al. | |
| 4,169,982 A | 10/1979 | Rittmann | |
| 4,223,831 A | 9/1980 | Szarka | |
| 4,321,594 A | 3/1982 | Galvin et al. | |
| 4,325,058 A * | 4/1982 | Wagner et al. | 340/562 |
| 4,340,826 A | 7/1982 | Muchnick | |
| 4,346,427 A | 8/1982 | Blissett et al. | |
| 4,365,167 A * | 12/1982 | Weimer et al. | 307/66 |
| 4,451,734 A | 5/1984 | St. Jean et al. | |
| 4,527,216 A | 7/1985 | Stammely | |
| 4,618,770 A | 10/1986 | Maile | |
| 4,630,684 A | 12/1986 | Cinzori et al. | |
| 4,703,171 A | 10/1987 | Kahl et al. | |
| 4,746,906 A | 5/1988 | Lederer | |
| 4,772,875 A | 9/1988 | Maddox et al. | |

(Continued)

OTHER PUBLICATIONS

"IT-200 InteliTimer® Pro Logger" (data sheets 1-2), Publication No. 5002, published by The Watt Stopper®, Inc., of Santa Clara, California (undated).

(Continued)

Primary Examiner—Jennifer Mehmood
(74) Attorney, Agent, or Firm—Jones Day; Garry J. Tuma

(57) ABSTRACT

Occupancy sensors are provided that do not require an external power source in order to operate. The sensors operate with a low voltage non-rechargeable battery and are fully functional for at least about 15-20 years. The sensors include a relay output capable of switching high or low voltage and high or low current with virtually no generated heat. The sensors require no warm-up period, no minimum load, and no external ground connection. The sensors are always active and are easily installed, having two electrically interchangeable outputs for coupling to, for example, a load and a load power source.

20 Claims, 7 Drawing Sheets

U.S. PATENT DOCUMENTS

| | | |
|---|---|---|
| 4,787,722 A | 11/1988 | Claytor |
| 4,825,079 A | 4/1989 | Takamatsu et al. |
| 4,864,278 A | 9/1989 | Wiley |
| 4,874,962 A | 10/1989 | Hermans |
| 4,890,093 A | 12/1989 | Allison et al. |
| 4,975,584 A | 12/1990 | Benjamin et al. |
| 5,015,994 A | 5/1991 | Hoberman et al. |
| 5,023,593 A | 6/1991 | Brox |
| 5,128,654 A | 7/1992 | Griffin et al. |
| 5,142,199 A | 8/1992 | Elwell |
| 5,151,840 A | 9/1992 | Siefken |
| 5,153,560 A | 10/1992 | Ichikawa |
| 5,155,474 A | 10/1992 | Park et al. |
| 5,189,393 A | 2/1993 | Hu |
| 5,266,807 A | 11/1993 | Neiger |
| 5,276,427 A | 1/1994 | Peterson |
| 5,307,051 A | 4/1994 | Sedlmayr |
| 5,311,024 A | 5/1994 | Marman et al. |
| 5,381,323 A | 1/1995 | Osteen et al. |
| 5,386,210 A | 1/1995 | Lee |
| 5,406,073 A | 4/1995 | Sharp et al. |
| 5,424,717 A | 6/1995 | Platt et al. |
| 5,428,345 A | 6/1995 | Bruno |
| 5,442,532 A | 8/1995 | Boulos et al. |
| 5,511,553 A * | 4/1996 | Segalowitz .................. 600/508 |
| 5,534,850 A | 7/1996 | Lee |
| 5,662,411 A | 9/1997 | Haslam et al. |
| 5,701,117 A | 12/1997 | Platner et al. |
| 5,786,644 A | 7/1998 | Zaretsky |
| 5,790,354 A * | 8/1998 | Altiti et al. ..................... 361/8 |
| 5,819,840 A * | 10/1998 | Wilson et al. .............. 165/11.1 |
| 5,909,378 A | 6/1999 | De Milleville |
| 6,215,398 B1 | 4/2001 | Platner et al. |
| 6,304,180 B1 | 10/2001 | Platner et al. |

OTHER PUBLICATIONS

"CX-100 Passive Infrared Sensor" (data sheet), Publication No. 6301, published by The Watt Stopper®, Inc., of Santa Clara, California (undated).

"SRN-2000W/PCN Super-Red Wireless PIR" (data sheets 1-4), published by Visonic Ltd., of Israel (Apr. 1998).

\* cited by examiner

SELF-POWERED LONG-LIFE OCCUPANCY SENSORS AND SENSOR CIRCUITS

CROSS REFERENCE TO RELATED APPLICATIONS

This is a division of U.S. patent application Ser. No. 10/144,450, filed May 10, 2002, now U.S. Pat. No. 6,850,159, which claims the benefit of U.S. Provisional Application No. 60/291,188, filed May 15, 2001, both of which are hereby incorporated by reference herein in their entireties.

BACKGROUND OF THE INVENTION

This invention relates to occupancy sensors. More particularly, this invention relates to occupancy sensors that can operate for extended periods of time without an external power source.

Occupancy sensors typically sense the presence of one or more persons within a designated area and generate occupancy signals indicative of that presence. Such occupancy signals may then drive, for example, a low voltage transformer and relay to activate or deactivate one or more electrical devices or appliances, such as, for example, room lighting or an HVAC (heating, ventilating, and air conditioning) system. Occupancy sensors help reduce energy and maintenance costs by turning devices and appliances OFF when not needed.

Accordingly, occupancy sensors are typically used in a variety of commercial, industrial, and residential settings. Most known occupancy sensors require an external power source in order to operate. That is, they require a connection to an external power source in order to power sensing, timing, and switching circuits that turn lights or other devices ON and OFF in accordance with sensed occupancy. Thus, a disadvantage of most known sensors is that they cannot be used in areas where power is not readily available.

Furthermore, the settings mentioned above typically have different electrical environments. For example, some settings have AC line voltage that may be 120, 240, 277, or 347 volts. Other settings may have only DC voltage supplies available. Another disadvantage of known occupancy sensors is that they typically can operate only within a narrow range of either AC or DC input voltage. For example, many known sensors can only operate at 120 volts AC. Such sensors are not likely to operate at, for example, 12 volts DC or 240 volts AC. Similarly, an occupancy sensor that can operate at 24 volts DC, cannot likely operate at an AC line voltage of 347 volts. Thus, known occupancy sensors are generally limited to a particular input voltage range and type (AC or DC). Such voltage limitations can significantly limit the types of applications in which known occupancy sensors can be used.

Another disadvantage of known occupancy sensors is that they often waste power in standby mode (i.e., when the sensor is not sensing occupancy). Power is wasted because known occupancy sensors continuously draw current. Often, this continuously drawn current is set to the peak current of the sensor. Peak current, however, is only required when occupancy is sensed, which is when most circuit activity occurs. Thus, more power than necessary is often dissipated (and thus wasted) in known sensors. This can become notable, for example, in an office complex where dozens of such sensors are deployed.

Moreover, unnecessary power dissipation is usually higher in known occupancy sensors with relay outputs. Relay outputs advantageously allow a sensor to be used in many different types of applications. However, relay outputs typically consume relatively large amounts of current. Sensors with relay outputs include a relay coil that is energized and de-energized as needed to switch the relay output to either couple power to a load (i.e., a device or appliance to be turned ON/OFF by the sensor) or decouple power from the load. Many known sensors maintain the coil in an energized state while in standby mode. This significantly increases power dissipation.

Another disadvantage of known occupancy sensors is that they are easily mis-wired during installation. Most sensors have wires for connection to the hot, neutral, and ground leads of a power source, and other wires for connection to a load and power source for the load (if different from the power source for the sensor). Wiring mistakes are common, typically causing installation delays and malfunctioning sensors, which may not always be immediately detected.

A further disadvantage of known occupancy sensors is that they usually require a warm-up period upon initial installation and after power outages. This also can delay installation because installers need to wait until warm-up is complete in order to ensure that sensors are functioning properly. Warm-up periods after power outages can also waste power because many known sensors warm up in the ON state. Thus, for example, lighting for a manufacturing floor may turn ON after power is restored at a time when no one is present. Conversely, other known sensors that warm up in the OFF state can further disrupt productivity after a power outage. For example, an occupied area may remain without lights or HVAC for the duration of the warm-up period after power is restored.

A few known occupancy sensors power some functions with a battery. For example, some sensors use the battery as backup in case of a power outage, to store data for later downloading to a computer, or to transmit a signal to a remote receiver. Battery-operated occupancy sensors, however, are not known to use a battery to operate a relay output which, as mentioned above, advantageously increases the versatility of the sensor. Furthermore, known battery-operated occupancy sensors typically cannot operate at extended periods of time without replacing the battery, thus maintenance costs may be higher for such sensors.

Some known occupancy sensors operate with rechargeable batteries. These sensors have additional disadvantages. For example, rechargeable batteries are usually more expensive than non-rechargeable batteries, have more internal leakage resulting in more rapid capacity loss, often require 24-48 hours of initial charging before the sensor is fully operational, typically require connection to a load in order to remain fully operational (the batteries leak current through the load while the load is off), and typically require a current transformer in series with the load in order to re-charge while the load is powered.

In view of the foregoing, it would be desirable to be able to provide an occupancy sensor that can operate for many years without an external power source.

It would also be desirable to be able to provide an occupancy sensor with a relay output that can operate for many years without an external power source.

It would further be desirable to be able to provide an occupancy sensor that dissipates very little power.

It would still further be desirable to be able to provide an occupancy sensor that is easily installed.

SUMMARY OF THE INVENTION

It is an object of this invention to provide an occupancy sensor that can operate for many years without an external power source.

It is also an object of this invention to provide an occupancy sensor with a relay output that can operate for many years without an external power source.

It is a further object of this invention to provide an occupancy sensor that dissipates very little power.

It is still a further object of this invention to provide an occupancy sensor that is easily installed.

In accordance with this invention, an occupancy sensor with a relay output is provided that does not require an external power source. Instead, the sensor is powered internally by an energy storage device, which is preferably a non-rechargeable preferably single-cell battery. The self-powered occupancy sensor can operate for extended periods of time (e.g., about 15-20 or more years) without replacement of the energy storage device. Moreover, the sensor does not require a warm-up period or connection to a load in order to be fully functional, nor does it require a current transformer to remain fully functional. Circuits of the self-powered occupancy sensor draw negligible, if any, current in standby mode and very small amounts of current during occupancy detection and switching of the relay output. Moreover, installation of the sensor is very easy, if not foolproof, requiring only two electrically interchangeable connections, one to a load and the other to a load power supply. No external connection to ground is required.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention provides a self-powered occupancy sensor that has a very long operating life of preferably about 20 years or more. The self-powered sensor includes a relay output that does not rely on voltage from an installation site. The relay output can switch large currents (with little generated heat) as well as very low currents such as those in signaling circuits. Thus, the self-powered sensor can be advantageously installed world wide regardless of local voltages and wiring. The sensor also can be advantageously used with many different types of devices and equipment including, for example, energy management systems (even open collector), solar powered devices, and other battery-operated equipment. Moreover, the sensor can be installed in remote areas with no available power for use with, for example, wireless devices and transmitters.

The self-powered occupancy sensor is enclosed in a housing having preferably only two external electrical conductors connected internally to the relay contacts. The two conductors are advantageously interchangeable and can be connected externally to, for example, a load and a load power source. Thus, the possibility of mis-wiring the conductors to the "hot" and "load" leads is substantially reduced, if not eliminated. Advantageously, because the sensor is self-powered, an externally connected ground wire is not required. Moreover, the sensor is always on and immune to utility power outages, and has no minimum load requirements.

Figure 1:
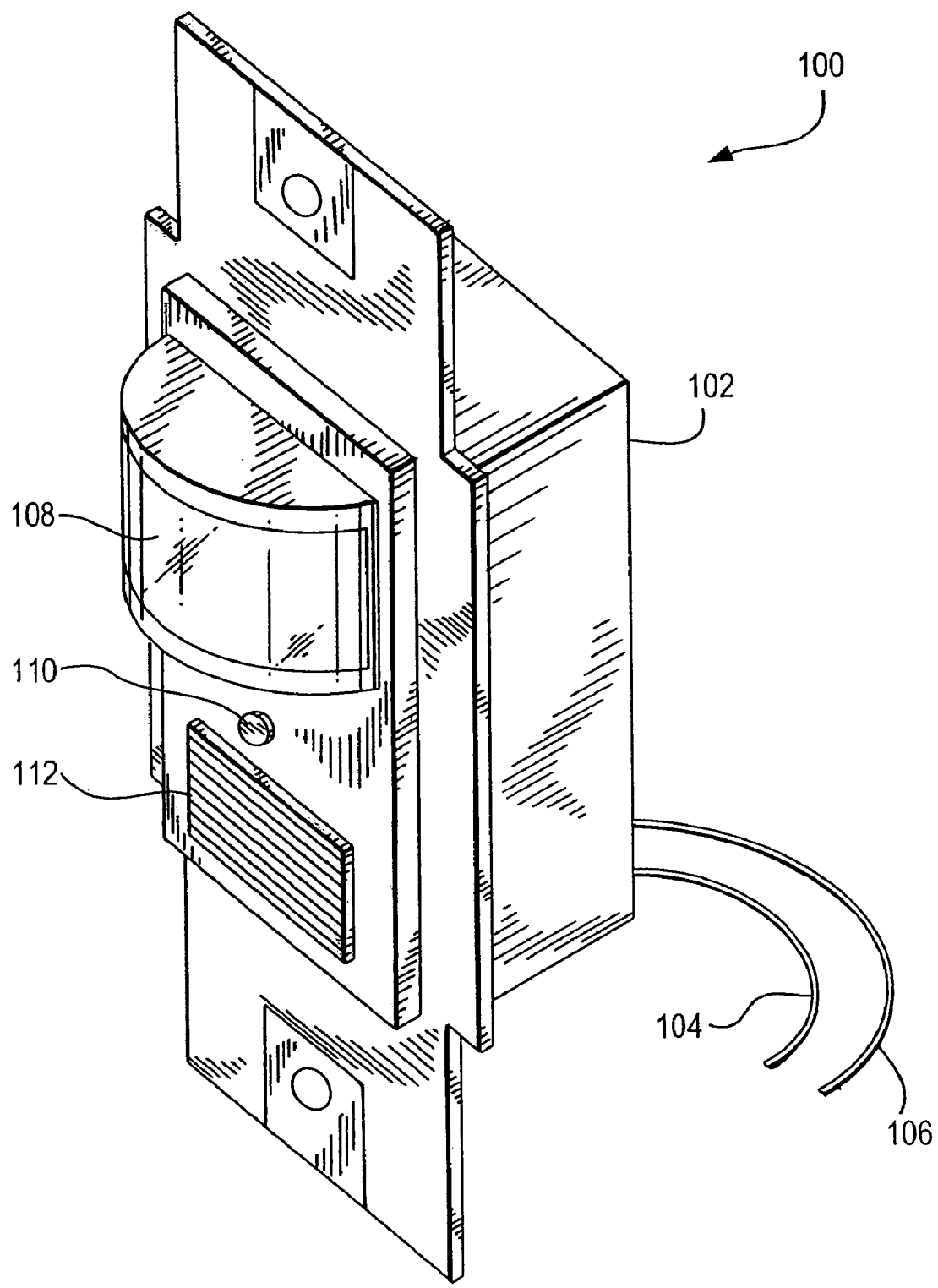
FIG. 1 is a perspective view of an exemplary embodiment of a self-powered occupancy sensor according to the invention.

FIG. 1 shows an embodiment of a self-powered occupancy sensor in accordance with the invention. Sensor 100 has a housing 102 dimensioned to enclose sensor circuits and an energy storage device (e.g., one or more batteries). Sensor 100 advantageously has only two wires 104 and 106 external to housing 102 that can be connected to a load (i.e., an electrical device or appliance whose ON/OFF state is controlled by the sensor) and a power source for the load. Advantageously, wires 104 and 106 can be interchangeably connected to the load and power source without adversely affecting the operation of the sensor or the load. That is, wire 104 can be connected to either the load or power source while wire 106 can be connected to the power source or load. Sensor 100 is preferably sized to be installed in a single gang switch box. Thus, it can replace a standard wall switch. Sensor 100 also preferably includes an optional Fresnel lens 108, an optional LED 110, and an optional manual override switch 112. Switch 112 preferably slides up and down and can be set in the AUTO (i.e., automatic) position for normal operation or in the OFF position to deactivate occupancy sensing.

Figure 2:
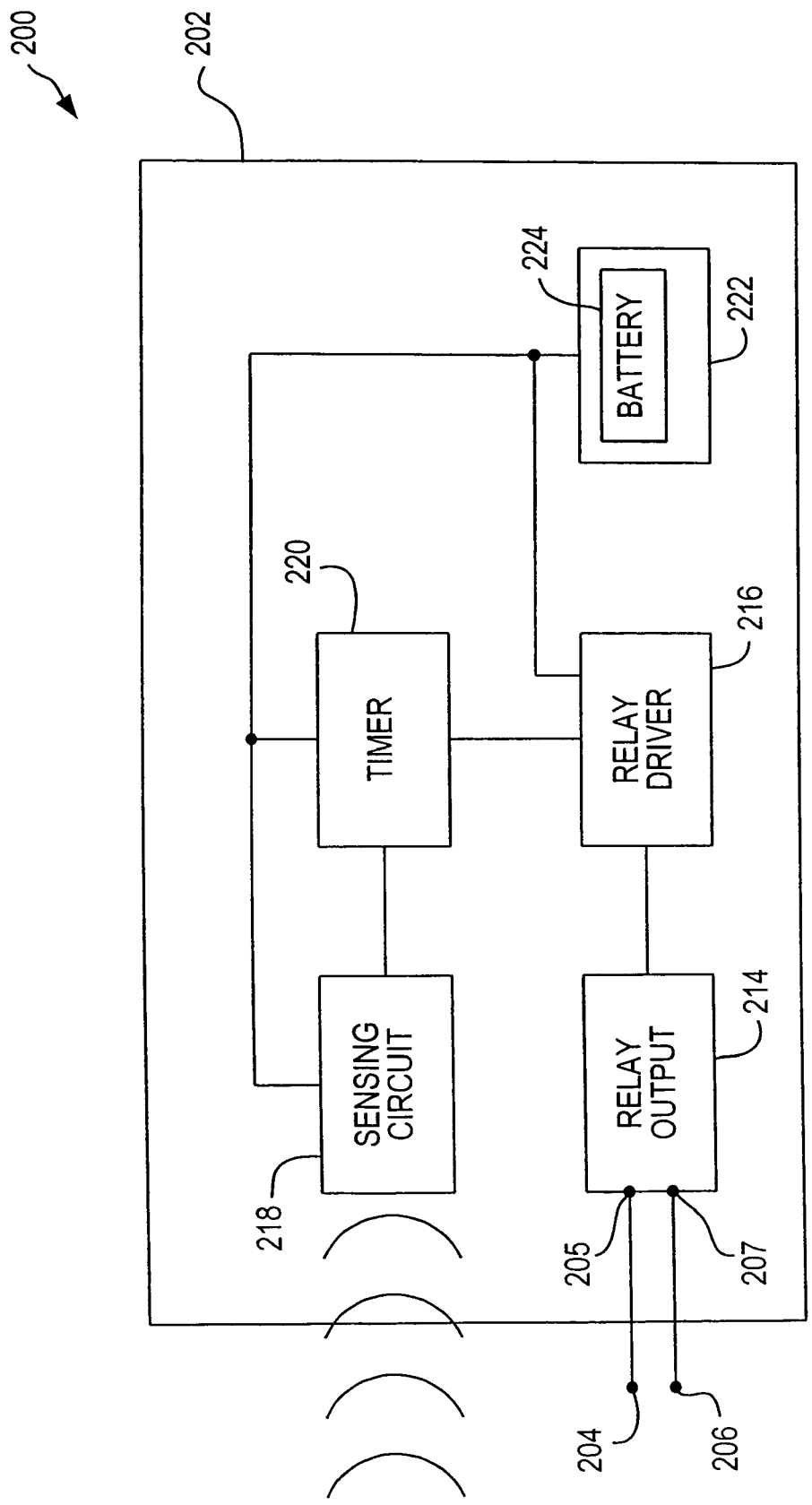
FIG. 2 is a block diagram of an exemplary embodiment of a self-powered occupancy sensor according to the invention.

FIG. 2 shows an embodiment of a self-powered occupancy sensor in accordance with the invention. Sensor 200 preferably includes housing 202, outputs 204 and 206, relay output circuit 214, relay driver 216, sensing circuit 218, timer 220, and energy storage device circuit 222. Energy storage device circuit 222 is configured to receive an energy storage device 224, which powers sensor 200 and is completely contained within housing 202. Energy storage device 224 is preferably a non-rechargeable single-cell battery, but can be other devices that perform similarly, as described further below. Energy storage device 224 can be installed either during manufacturing and assembly of the sensor or thereafter. And although not intended to require regular replacing or servicing, an optional removable or hinged door (not shown) in housing 202, as is known in the art of other battery-operated devices, can be provided to install and remove energy storage device 224.

Relay output circuit 214 has electrical conductors 204 and 206 connected to relay contacts 205 and 207, respectively. Relay output circuit 214 includes an armature for setting relay contacts 205 and 207 in either an open-circuit state (i.e., no conductive path between contacts 205 and 207 through relay output circuit 214) or a closed-circuit state (i.e., a conductive-path between contacts 205 and 207 through relay output circuit 214).

Relay driver 216 is a low power preferably latching relay circuit (e.g., requiring about 10 msec of a 200 mW pulse) that consumes virtually zero current in standby mode and very little current from energy storage device 224 when producing pulses to transfer relay output 214 from one state to the other. Relay driver 216 includes a relay coil and preferably operates with voltages ranging from about 3.6 volts to about 2.4 volts or less.

Sensing circuit 218 preferably includes passive infrared (PIR) technology to sense occupancy within a designated area. PIR technology senses the difference between the heat generated by the designated area and the heat generated by a person entering that area, and generally results in less false-tripping than other sensing technologies. Alternatively, however, sensing circuit 218 can include other sensing technologies such as, for example, ultrasonic sensing, photoelectric sensing, sound sensing, or any combination thereof, now known or later developed, provided that their power requirements are substantially similar to that of PIR technology.

Sensing circuit 218 also preferably includes a two-stage operational amplifier circuit that preferably requires only several microamps of current to operate. Alternatively, an appropriately designed single-stage amplifier circuit may be used instead. When occupancy is sensed, sensing circuit 218 generates and amplifies an occupancy signal (e.g., a logical 1 signal, represented by a "high" or upper-rail voltage).

Timer 220 prevents the lights or other devices controlled by sensor 200 from turning OFF during brief periods of non-occupancy. Timer 220 preferably has selectable time periods and is activated by receipt of a signal indicating occupancy from sensing circuit 218. Receipt of additional occupancy signals during a selected time period resets that time period. If no other occupancy signals are received, the lights or other devices will turn OFF upon expiration of the time period. Timer 220 draws very little current when activated and virtually no current in standby mode.

In an alternative embodiment, timer 220 need not be included in sensor 200. Occupancy signals generated by sensing circuit 218 can be instead fed directly to relay driver 216.

FIGS. 3-9 show exemplary embodiments of circuits that can be used in self-powered long-life occupancy sensors constructed in accordance with the invention. Circuits 300, 400, 500, 600, 700, 800, and 900 coupled together as indicated in FIGS. 3-9 form an exemplary embodiment of a self-powered long-life occupancy sensor in accordance with the invention.

Figure 3:
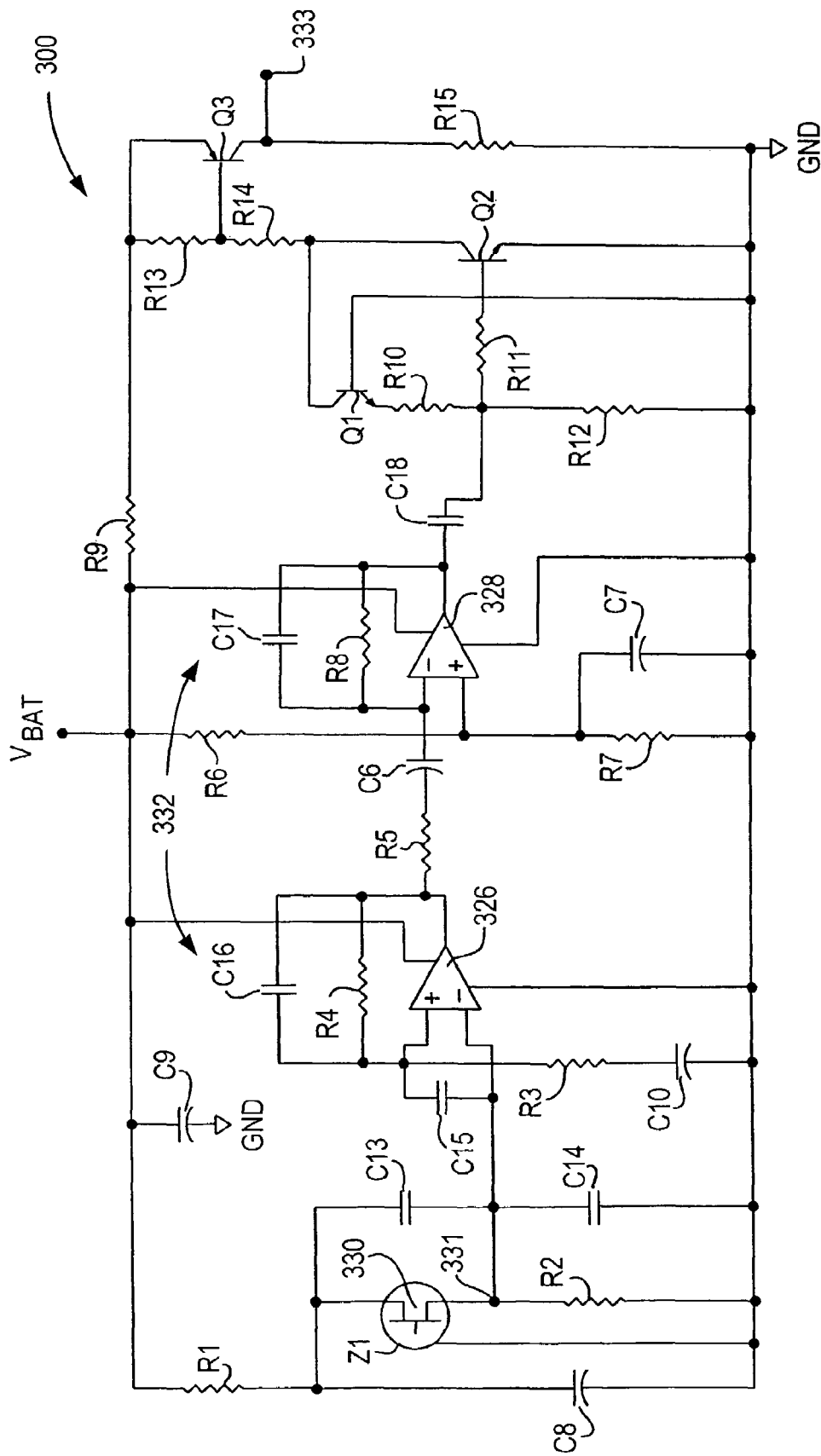
FIGS. 3-9 are circuit diagrams of exemplary embodiments of sensor circuits according to the invention.

FIG. 3 shows an exemplary embodiment of a PIR sensing circuit in accordance with the invention. Sensing circuit 300 preferably includes resistors R1-R15, capacitors C6-C10 and C13-C18, NPN transistors Q1 and Q2, PNP transistor Q3, piezoelectric chip Z1, and operational amplifiers (opamps) 326 and 328. Opamps 326 and 328 operate with very low current, requiring no more than about 15 microamperes each. Preferably, however, they require only about 7 microamperes each, and more preferably only about 1 microampere each. Opamps 326 and 328 can be, for example, ultra-low power OPA2349 dual opamps, manufactured by Burr-Brown, of Tucson, Ariz. Alternative embodiments may only include one opamp, as is known in the art. The overall current (and thus power) required by an occupancy sensor of the invention is predominately determined by the opamp current.

Sensing circuit 300 operates preferably as follows: when temperature in an area sensed by an occupancy sensor of the invention increases (e.g., when a person enters the area), chip Z1 generates a very small voltage with high impedance. FET transistor 330, which is included in chip Z1 and lowers the impedance to an acceptable level, outputs a signal at node 331 indicating occupancy. The signal is amplified via two-stage bandpass amplifier 332. Resistor R12 ground references the signal from opamp 328. If that signal goes positive by about 0.4 volts, transistor Q2 turns ON (i.e., conducts current). If the signal goes negative by about 0.4 volts, transistor Q1 turns ON. If either or both transistors Q1 and Q2 turn ON, Q3 also turns ON. This causes the collector of transistor Q3 (node 333) to rise from the lower rail (e.g., the sensor's internal ground) to about the upper rail (e.g., $V_{BAT}$).

Figure 4:
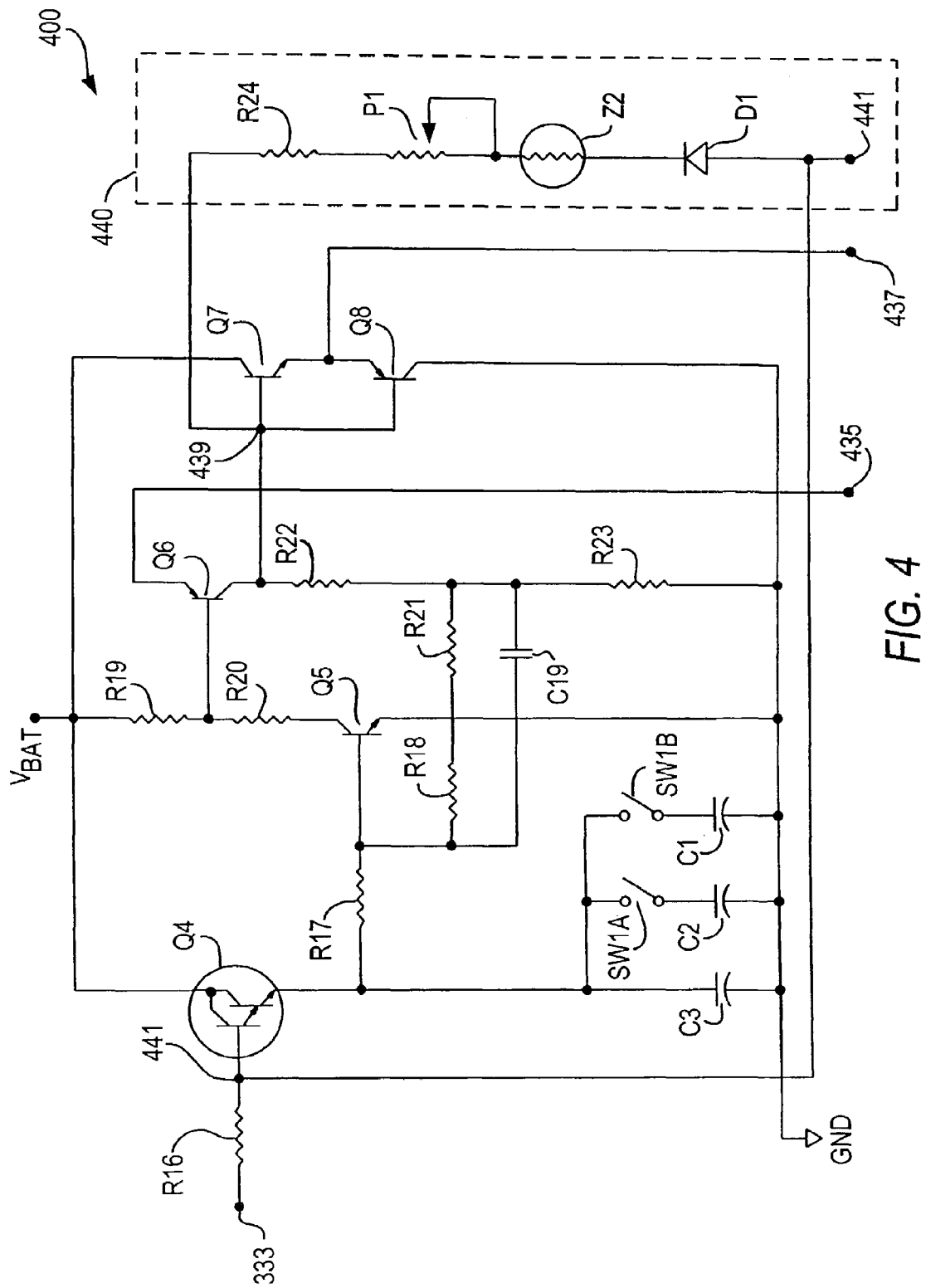

FIG. 4 shows an exemplary embodiment of a timer circuit in accordance with the invention. Timer circuit 400 preferably includes resistors R16-R23, optional capacitors C1 and C2, capacitors C3 and C19, optional switches SW1A and SW1B (to be used with optional capacitors C1 and C2), NPN Darlington pair Q4, NPN transistors Q5 and Q7, PNP transistors Q6 and Q8, and optional photocell circuit 440.

Figure 8:
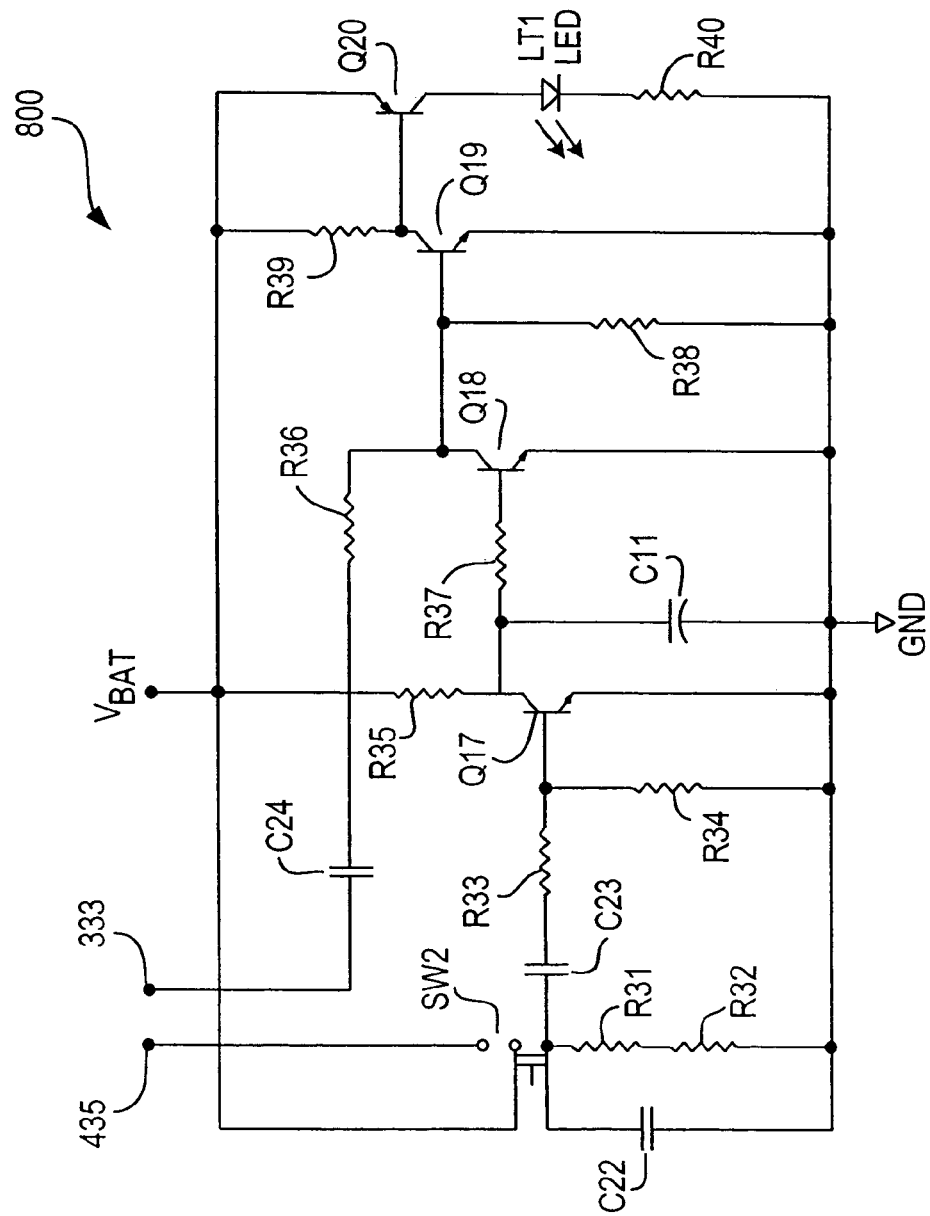

Timer circuit 400 operates preferably as follows: when node 333 (i.e., a node that receives signals indicating occupancy) goes high (indicating occupancy), the base of Darlington pair Q4 (node 441) also goes high. This causes the emitter of Q4 to go high (because Q4 is an emitter follower), but less high by about two emitter voltage drops of about 1.2 volts. Timing capacitor C3 then charges up. If either or both switches SW1A and SW1B are closed (e.g., by a user modifying the time period of timer circuit 400), timing capacitors C1, C2, or both will also charge up. The voltage on the timing capacitors turns ON transistor Q5. This causes transistor Q6 to turn ON, assuming that the occupancy sensor is ON (e.g., switch 112 of sensor 100 is set in AUTO mode, or SW2 of FIG. 8 is in the up (AUTO) position, which connects the collector of Q6 to $V_{BAT}$ via node 435). Transistor Q6 then turns ON rapidly because of feedback resistors R18 and R21. This causes the collector of transistor Q6 to suddenly rise, turning emitter follower Q7 ON. This puts the upper-rail voltage on relay driver capacitors C20 and C21 (of FIG. 5) via node 437. When the one or more timing capacitors discharge (through resistors R17 and conducting transistor Q5), transistors Q5 and Q6 rapidly turn OFF. The falling collector of transistor Q6 turns OFF transistor Q7 and turns ON transistor Q8. This puts the lower-rail voltage on relay driver capacitors C20 and C21. Note that resistors R18 and R21 provide a feedback path that turns transistors Q5 and Q6 ON and OFF more rapidly.

Advantageously, when capacitors C1, C2, and C3 are not charged (i.e., when occupancy is not being sensed, also referred to as standby mode), timer circuit 400 draws no current.

The selection of either timing capacitors C1, C2, both, or neither via switches SW1A and SW1B produces four different timing intervals. If values for capacitors C1, C2, and C3 are about 22 µf, 15 µf, and 1 µf, respectively, and if values for resistors R17, R18, R21, and R23 are about 10M ohms, 10M ohms, 4.7M ohms, and 220 k ohms, respectively, time periods between about 30 seconds and about 20 minutes can be selected. A person can thus leave a sensed area and return within the selected time period without having the lights or other electrical devices or appliances abruptly turned off. Alternatively, of course, timing circuit 400 can have other configurations of switches and capacitors and values thereof to provide other numbers of timing intervals and interval durations. For example, a rotary switch can be used (instead of switches SW1A and SW1B) with the three capacitors to provide three different timing intervals.

Optional photocell circuit 440 inhibits sensor operation if there is sufficient daylight in the sensed area. Photocell circuit 440 preferably includes resistor R24, potentiometer P1, photocell Z2, and diode D1, and operates preferably as follows: when timer circuit 400 is OFF (i.e., the timing capacitors are not charging or discharging), node 439 is low. If potentiometer P1 is set low enough and if sufficient light is on photocell Z2 to lower Z2's variable resistance enough, the base of Darlington pair Q4 is held low (e.g., near the sensor's internal ground). This prevents Q4 from accepting occupancy signals (i.e., from turning ON). If the occupancy sensor is sensing occupancy, node 439 is high and the reversed biased diode D1 prevents the photocell circuit from influencing whether or not the sensor can process occupancy signals.

Figure 5:
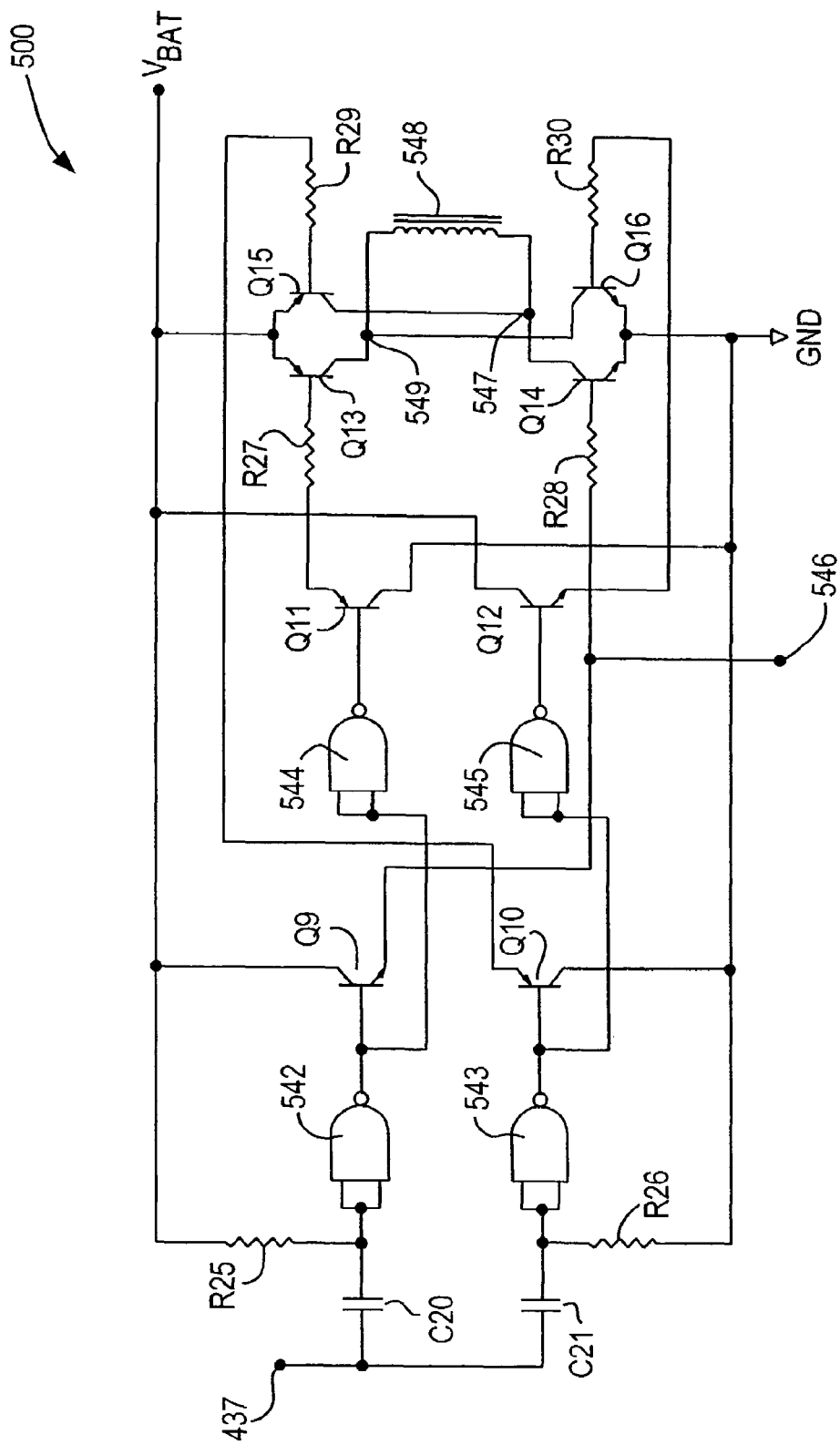

FIG. 5 shows an exemplary embodiment of a relay driver in accordance with the invention. Relay driver 500 is preferably a latching relay requiring about 10 milliseconds of pulse current in one polarity to cause the relay contacts to close and the same type of pulse in the other polarity to cause the relay contacts to open. The pulse amplitude and duration are preferably what the relay manufacturer requires for reliable operation and no more. Relay driver 500 preferably includes capacitors C20 and C21; resistors R25-R30; NPN transistors Q9, Q12, Q14, and Q16; PNP transistors Q10, Q11, Q13, and Q15; NAND gates 542-545; and relay coil 548. Transistors Q9-Q16 are arranged to produce very high collector currents with very little input base current. They saturate substantially completely, allowing virtually all pulse current to enter relay coil 548. Advantageously, relay driver 500 draws a negligible amount of current in view of the total current drawn by an occupancy sensor of the invention.

NAND gates 542-545 can be, for example, either the 4001 or 4011 two-input quad logic chip, available from many chip manufacturers. NAND gates 542-545 operate on preferably about 3 volts or less and draw near zero current. Note that the NAND logic function is not required. Other logic gates, such as NORs or inverters, can be used instead provided that they preferably draw no current in standby mode and near zero current when switching, have very high input impedance, very low output impedance, and switch rapidly.

Relay driver 500 operates preferably as follows: when capacitor C20 receives the upper-rail voltage at node 437 from timer circuit 400 (or other circuit or source that generates signals indicating occupancy), C20 does nothing because its other side is at the upper rail (e.g., $V_{BAT}$). However, the upper-rail voltage at node 437 causes the output of NAND gate 543 to go low for the R-C duration of capacitor C21 and resistor R26. This output turns transistor Q10 ON, which turns transistor Q15 ON. Upper-rail voltage is now at node 547, to which one terminal of relay coil 548 is coupled. The low output of NAND gate 543 also causes the output of NAND gate 545 to go high, which turns transistor Q12 ON. This turns transistor Q16 ON. Node 549, to which the other terminal of relay coil 548 is coupled, goes down to about the sensor's internal ground voltage. Relay coil 548 now transfers the relay contacts to the ON position (i.e., the closed-circuit state).

When capacitors C20 and C21 receive the lower-rail voltage (e.g., when the timing interval of timer circuit 400 expires), capacitor C20 and resistor R25 produce a negative pulse that activates NAND gate 542 for the same R-C time constant (capacitor C21 and resistor R26), causing its output to go high. This turns transistor Q9 ON, which turns transistor Q14 ON. Node 547 goes down to about the sensor's internal ground voltage. NAND gate 542's high output also causes the output of NAND gate 544 to go low, turning transistor Q11 ON. This turns transistor Q13 ON, which brings node 549 up to about $V_{BAT}$. Relay coil 548 now transfers the relay contacts to the OFF position (i.e., the open-circuit state).

Figure 6:
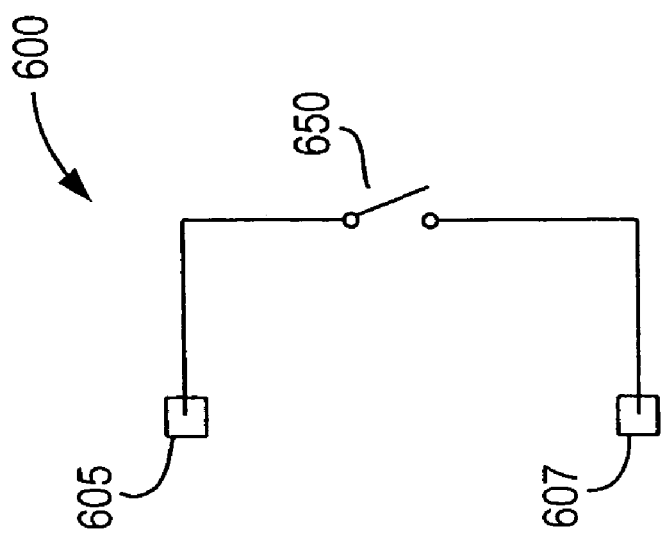

FIG. 6 shows an exemplary embodiment of a relay output circuit in accordance with the invention. Relay output 600 has relay output contacts 605 and 607 and a switch (e.g., armature) 650, and can be, for example, a G6C power PCB relay manufactured by Omron Electronics LLC, of Schaumburg, Ill. Output contacts 605 and 607 are typically connected to electrical conductors for connection to a load and a load power source. Advantageously, either contact can be coupled to the load while the other can be coupled to the load power source, because they are electrically interchangeable. This virtually eliminates wiring errors during installation.

Armature 650 is operated by relay driver 500. In particular, relay coil 548 drives armature 650 to connect and disconnect contacts 605 and 607 to and from each other. Thus, for example, if one contact is coupled to room lighting and the other contact is coupled to AC line voltage, the sensing of occupancy by an occupancy sensor of the invention generates an occupancy signal in sensing circuit 300 setting timer circuit 400, which causes relay driver 500 via relay coil 548 to transfer armature 650 to the ON position, closing the connection between contacts 605 and 607. AC voltage is now coupled to the room lighting, turning the lights ON. When occupancy is no longer sensed, timer circuit 400 times-out, which causes relay driver 500 via relay coil 548 to transfer armature 650 to the OFF position, opening the connection between contacts 605 and 607. AC voltage is now decoupled from the room lighting, turning the lights OFF.

Figure 7:
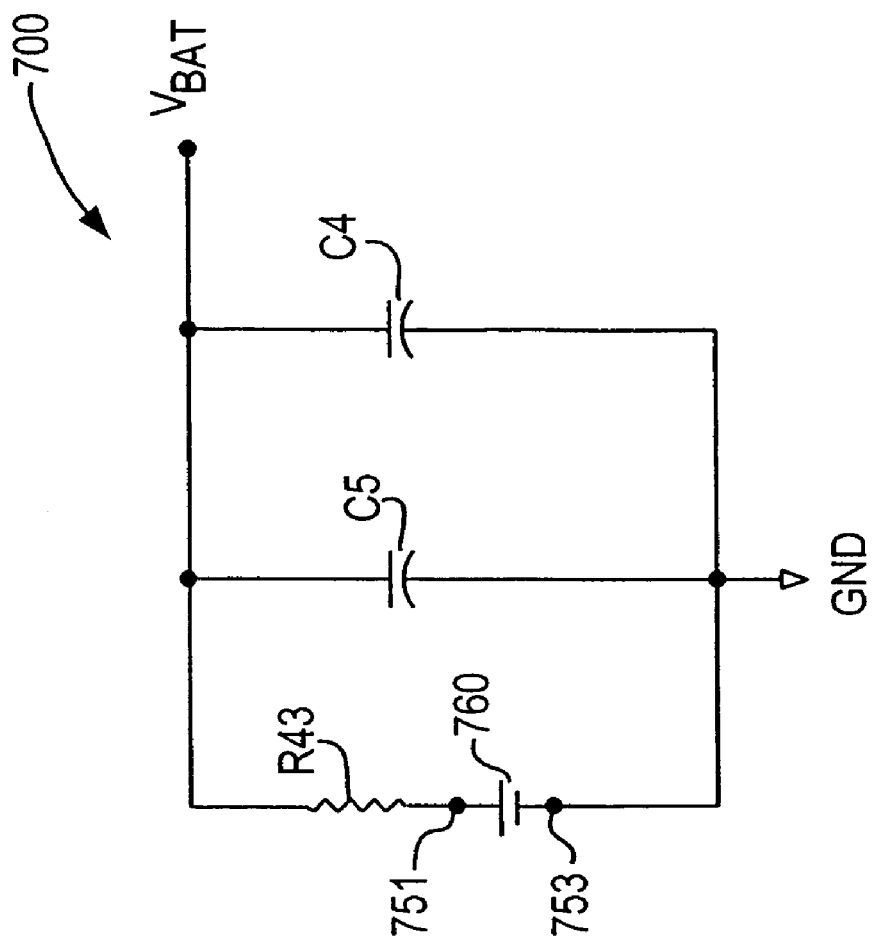

FIG. 7 shows an exemplary embodiment of an energy storage device circuit in accordance with the invention. Energy circuit 700 includes inputs 751 and 753 between which an energy storage device 760 is connected in order to power occupancy sensor circuits. Energy storage device 760 is preferably a single-cell battery, but can alternatively be, for example, a capacitor or fuel cell having suitable holding, current, and voltage capabilities. Device 760 is preferably non-rechargeable and preferably a 3.6 volt, 2100 mA hour, lithium non-rechargeable battery (preferably for use with embodiments of the invention in which opamps 326 and 328 draw at most about 7 microamps each). Such a battery can be obtained from, for example, Tadiran U.S. Battery Division, of Port Washington, N.Y. Alternatively, energy storage device 760 can be a 3.6 volt, 5200 mA hour, lithium non-rechargeable battery, or two of the above 2100 mA hour batteries preferably for use with those embodiments of the invention in which opamps 326 and 328 draw up to about 15 microamps each.

Energy circuit 700 preferably also includes capacitors C4 and C5. Capacitors C4 and C5 provide a lower effective impedance than the impedance of battery 760 alone. A lower effective impedance enables battery 760 to maintain a higher voltage when large amounts of current are demanded from it, such as when pulse current is applied to the relay coil. In one embodiment of energy circuit 700, capacitors C5 and C4 are each about 220 µf.

Energy circuit 700 preferably further includes a resistor R43. Resistor R43 is preferably of low value and, in standby mode, current through resistor R43 is no more than about 30 microamperes, preferably no more than about 15 microamperes, and more preferably no more than about 5 microamperes. In one embodiment of energy circuit 700, resistor R43 is preferably about 33 ohms.

FIG. 8 shows an exemplary embodiment of an optional LED circuit in accordance with the invention. LEDs (light emitting diodes) are typically used in occupancy sensors to indicate when occupancy is being sensed. They do so by illuminating. However, because LEDs consume relatively large amounts of current, limiting their operation is advantageous. In accordance with the invention, a user can manually activate LED circuit 800 for a limited period of time by setting a manual override switch (e.g., override switch 112 of sensor 100 shown in FIG. 1) to OFF and then back to AUTO. The user can then test the operation of the sensor by stepping in and out of the sensor's field of view and observing whether the LED illuminates or not. After the limited period of time expires, LED circuit 800 automatically deactivates, thus saving power.

LED circuit 800 preferably includes manual override switch SW2, resistors R31-R40, capacitors C11 and C22-C24, NPN transistors Q17-Q19, PNP transistor Q20, and LED LT1. In normal sensor operation, switch SW2 is in AUTO mode, which is the up position in FIG. 8, wherein LED circuit 800 is inactive. To activate LED circuit 800, switch SW2 is moved to the down position as shown, which is OFF mode, and then back to AUTO mode. The sensor will not respond to occupancy in OFF mode, because switch SW2 disconnects $V_{BAT}$ (via node 435) from the collector of timing circuit transistor Q6 (FIG. 4). Moving switch SW2 to OFF mode puts a positive pulse into the base of transistor Q17, turning it ON. Capacitor C11 then discharges through transistor Q17, which turns transistor Q18 OFF. Transistor Q19 can now accept pulses from capacitor C24 each time a signal indicating occupancy is received at node 333 (e.g., from sensing circuit 300). When transistor Q19 turns ON, it causes transistor Q20 to turn ON, which turns LED LT1 ON for the pulse duration determined by the R-C time constant of resistor R36 and capacitor C24. Regardless of whether SW2 is left in OFF mode (the down position) or returned to AUTO mode (the up position), transistor Q17 remains OFF allowing resistor R35 to charge capacitor C11. When the voltage on capacitor C11 is sufficiently high, transistor Q18 turns ON, which turns transistor Q19 OFF. Transistor Q19 is now prevented from receiving any more pulses from sensing circuit 300 (i.e., is prevented from turning ON). Thus, LED LT1 remains active for the time period determined by the R-C time constant of resistor R35 and capacitor C11. Advantageously, LED circuit 800 draws minute current from energy storage device 760 when the LED is deactivated, and very little of the total sensor current while the LED is active during those limited periods of time.

Figure 9:
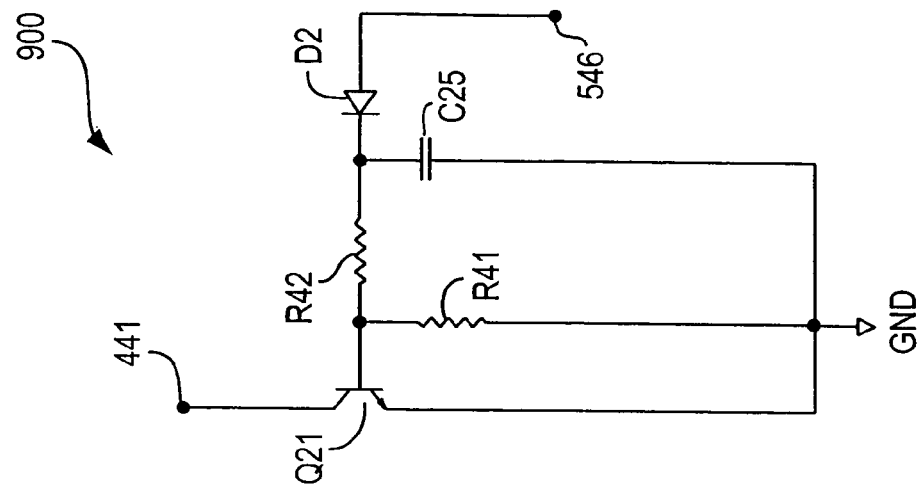

FIG. 9 shows an exemplary embodiment of an optional lock-out circuit in accordance with the invention. Lock-out circuit 900 locks out signals indicating occupancy generated by sensing circuit 300 for about 500 milliseconds after timer circuit 400 times-out. This prevents sensing circuit 300 from mistakenly generating an occupancy signal in response to relay contact arcing. Relay contact arcing can occur when the armature opens the connection between the relay output contacts.

Lock-out circuit 900 preferably includes resistors R41 and R42, capacitor C25, NPN transistor Q21, and diode D2, and operates preferably as follows: when the relay driver OFF pulse appears at the base of transistor Q9 (FIG. 5), it charges up capacitor C25 via node 546. Capacitor C25 then turns transistor Q21 ON for preferably about a half second. The base of Darlington pair Q4 (FIG. 4), which is connected to the collector of transistor Q21 via node 441, is held at the sensor's ground for this short duration. This prevents any occupancy signals generated by sensing circuit 300 from propagating through timer circuit 400 during that half second.

Note that at least some of the circuits described above, or portions of them, are not limited solely to use in occupancy sensors, but alternatively can be used in other devices, such as, for example, data loggers and proximity sensors.

Thus it is seen that self-powered long-life occupancy sensors and sensor circuits are provided. One skilled in the art will appreciate that the invention can be practiced by other than the described embodiments, which are presented for purposes of illustration and not of limitation, and the invention is limited only by the claims which follow.

I claim:

1. A method of coupling a first relay output to a second relay output based on occupancy sensed within a designated area, said method comprising:
sensing occupancy within said designated area;
generating a signal indicating occupancy in response to said sensing; and
coupling said first and second relay outputs to each other using an armature operative to couple AC line voltage with no more than about 3 volts supplied to a latching relay circuit that generates a single electrical pulse in response to the generated signal, the 3 volts provided exclusively by a non-rechargeable battery.

2. The method of claim 1 wherein said coupling comprises coupling said first and second relay outputs to each other using a relay coil powered by no more than about 3 volts supplied by a non-rechargeable battery in response to said generated signal.

3. The method of claim 1 wherein said non-rechargeable battery supplies no more than about 3-6 volts.

4. The method of claim 1 wherein said first relay output is operative to be coupled to a load and said second relay output is operative to be coupled to power for said load.

5. The method of claim 1 wherein said generating comprises amplifying a signal indicating occupancy using no more than about 30 microamperes of current supplied by said non-rechargeable battery in response to said sensing.

6. The method of claim 1 further comprising:
activating a timer for a limited period of time in response to said generated signal;
decoupling said first and second outputs from each other in response to said limited period of time expiring; and
powering said generating, said activating, and said decoupling with said non-rechargeable battery.

7. The method of claim 1 further comprising:
illuminating a light emitting diode in response to said generated signal; and
powering said sensing, said generating, and said illuminating with said non-rechargeable battery.

8. The method of claim 1 further comprising enclosing said non-rechargeable battery, said sensing, said generating, and said coupling in a single housing.

9. A method of coupling a first relay output to a second relay output based on occupancy sensed within a designated area, said method comprising:
sensing occupancy within said designated area;
generating a signal to a timer, wherein the signal indicates occupancy in response to said sensing;
activating the timer for a limited period of time in response to said generating a signal;
applying a voltage pulse of a first polarity across a relay coil in response to said activating;
coupling said first and second relay outputs to each other with no more than about 3 volts supplied by a non-rechargeable battery in response to said generated signal;
applying a second voltage pulse of a second polarity across said relay coil in response to said limited period of time expiring;
decoupling said first and second relay outputs from each other in response to said applying a second voltage pulse; and
powering said timer and said relay coil with said non-rechargeable battery.

10. Apparatus for coupling a first relay output to a second relay output based on occupancy sensed within a designated area, said apparatus comprising:
means for sensing occupancy within said designated area;
means for generating a signal indicating occupancy in response to sensing occupancy; and
means for coupling said first and second relay outputs to each other using an armature operative to couple AC line voltage with no more than about 3 volts supplied to a latching relay circuit that generates a single electrical pulse in response to the generated signal, the 3 volts provided exclusively by a non-rechargeable battery.

11. The apparatus of claim 10 further comprising:
means for coupling said first relay output to a load; and
means for coupling said second relay output to power for said load.

12. The apparatus of claim 10 wherein said means for generating comprises means for amplifying a signal indicating occupancy using no more than about 30 microamperes of current supplied by said non-rechargeable battery in response to said sensing.

13. The apparatus of claim 10 further comprising means for illuminating a light emitting diode in response to generating a signal.

14. The apparatus of claim 10 further comprising means for enclosing said non-rechargeable battery, said means for sensing, said means for generating, and said means for coupling.

15. The apparatus of claim 14 wherein said means for enclosing comprises a single housing.

16. The apparatus of claim 10 wherein said means for coupling comprises a relay coil.

17. The method of claim 9 further comprising:
coupling said first relay output to a load; and
coupling said second relay output to power for said load.

18. The method of claim 9 wherein said generating comprises amplifying a signal indicating occupancy using no more than about 30 microamperes of current supplied by said non-rechargeable battery in response to said sensing.

19. The method of claim 9 further comprising illuminating a light emitting diode in response to said generated signal.

20. The method of claim 9 further comprising enclosing said non-rechargeable battery, said sensing, said generating, and said coupling in a single housing.

* * * * *

UNITED STATES PATENT AND TRADEMARK OFFICE
CERTIFICATE OF CORRECTION

PATENT NO.        : 7,576,647 B1                                        Page 1 of 1
APPLICATION NO. : 11/045931
DATED             : August 18, 2009
INVENTOR(S)       : Philip H Mudge It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 873 days.

Signed and Sealed this

Fourteenth Day of December, 2010

David J. Kappos
*Director of the United States Patent and Trademark Office*